Sept. 29, 1964 G. N. HALPIN 3,151,255

TRANSISTOR FLIP FLOP CIRCUIT WITH MEMORY

Filed April 17, 1961

INVENTOR.
GEORGE N. HALPIN

BY Merlon D Moore

ATTORNEY

United States Patent Office 3,151,255
Patented Sept. 29, 1964

3,151,255
TRANSISTOR FLIP FLOP CIRCUIT WITH MEMORY

George N. Halpin, Phoenix, Ariz., assignor to General Electric Company, a corporation of New York
Filed Apr. 17, 1961, Ser. No. 103,586
5 Claims. (Cl. 307—88.5)

Figure 1:
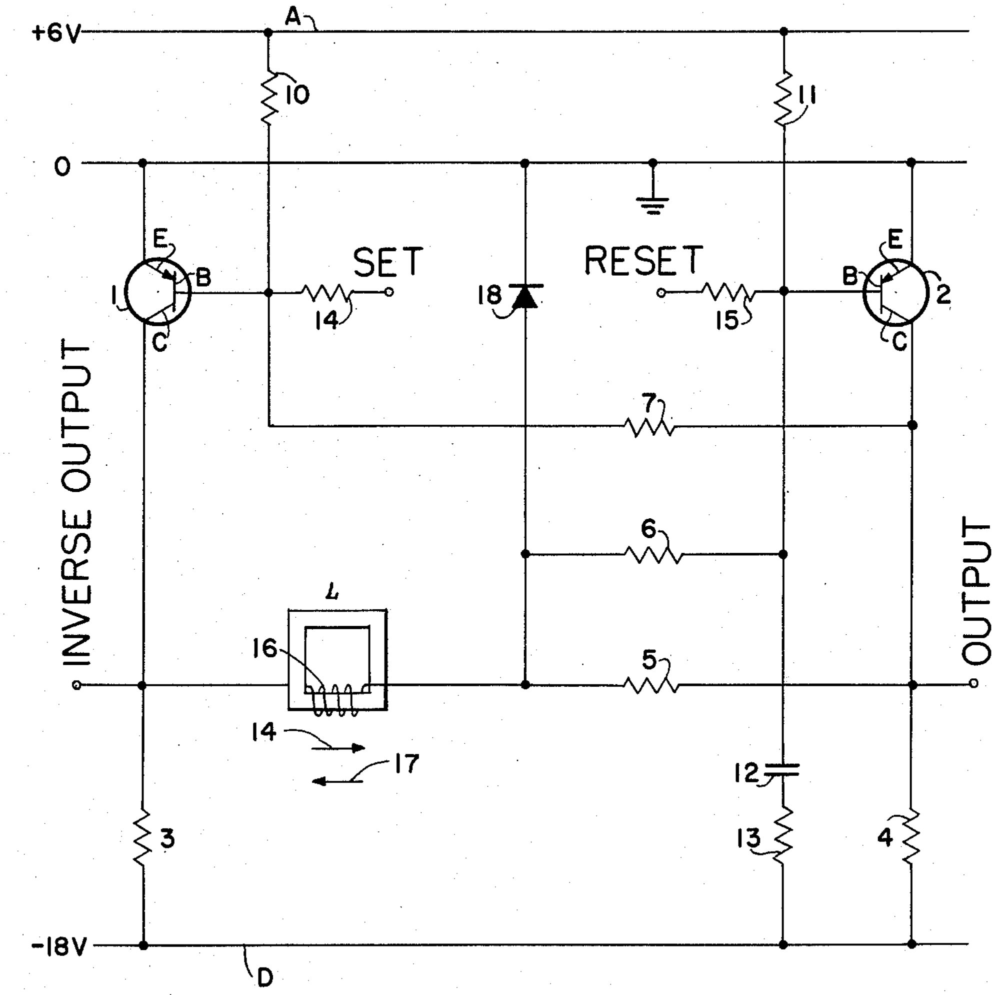

My invention relates to transistor flip flop circuits and it has for one of its objects to provide such a transistor flip flop circuit which, when operating potential is interrupted, and then restored, the flip flop assumes the condition that it was in when the interruption occurred.

In transistor flip flop circuits, when either transistor is conducting the other is nonconducting. The circuit structure is such that current flowing in either transistor automatically renders the other transistor nonconducting.

When operating potential is first applied to such a flip flop either transistor may become conductive, and having done so, it turns the other transistor off. It is not always predictable which transistor will first become conductive. One transistor may first become conductive on one application of operating potential and the other on the next.

In many applications this is unobjectionable. However, in other applications, such as in data processing, this situation may be quite intolerable. In these situations, if, after an interruption of power the flip flop does not come back on in the same condition in which it was, on occurrence of the interruption, unfortunate consequences may result.

Accordingly, an object of my invention is to provide means to assure that when operating potential to a transistor flip flop is interrupted and then reapplied the transistor that was conducting when power was interrupted again becomes conducting and the transistor that was nonconducting again becomes nonconducting.

In carrying my invention into effect I make use of a magnetic core memory device comprising a winding on a magnetic core and which is connected in the transistor circuit in such a way that when one transistor is conducting current flows in one direction in the winding, and when the other transistor is conducting current flows in the other direction in the winding. These currents are such as to produce a remanence flux in the core in a corresponding direction after the currents are interrupted. This remanence flux is sufficient to render the winding of high impedance to currents producing flux which oppose the remanence and low impedance to currents producing flux that aids the remanence flux.

I then produce a transient condition in one transistor tending to render it conductive but utilize the high impedance of the memory device to prevent it from becoming conductive. The transient, however, is such as to render the other transistor conductive which through normal flip flop action prevents the first from becoming conductive.

Should the first transistor be the one that was conductive when the power interruption occurred the memory device will have low impedance when power is reapplied and the first transistor will again become fully conductive.

The novel features which I believe to be characteristic of my invention are set forth with particularity in the appended claims. My invention itself, however, both as to its organization and method of operation, together with further objectives and advantages thereof, may best be understood by reference to the following description taken in connection with the accompanying drawing in which FIG. 1 repersents an embodiment of my invention and FIG. 2 illustrates the hysteresis characteristic of the memory device employed therein.

Figure 2:
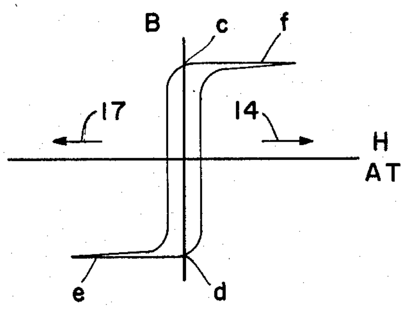

Referring to the FIG. 1 of the drawing, my invention is illustrated as comprising a pair of transistors 1 and 2, each comprising a base electrode B, an emitter electrode E and a collector electrode C. The base electrodes of transistors 1 and 2 are connected through respective resistors 10 and 11 to a source of potential positive with respect to ground indicated by the conductor A and marked +6 v. indicating the voltage thereon. The emitter electrodes of transistors 1 and 2 are connected directly to ground. The collector electrodes are connected through respective load resistors 3 and 4 to the negative terminal of the source of operating voltage identified by the conductor D marked −18 v. Output voltages may be taken from across these resistances as indicated on the drawing.

The indications of plus 6 volts and minus 18 volts are, of course, only typical and other values may be chosen dependent upon the transistors used and other circuit considerations.

The collector electrode C of transistor 2 is connected to the base electrode B of transistor 1 through resistor 7. Similarly, the collector electrode of transistor 1 is connected to the base of transistor 2 through a resistance 6. These are connections by which current in the collector electrode of either transistor and load resistance applies potential to the base of the other transistor turning it off.

Ignoring inductor L, condenser 12, and resistors 5 and 13, the circuit is a conventional commonly used flip flop circuit in which, when power is applied to conductors A and D, one transistor becomes conducting and causes the other transistor to become nonconducting. Numerous factors affecting the circuit may determine which of the two transistors first becomes conducting so as to turn the other transistor off. Largely it is a matter of random operation, on one application of power to conductors A and D one transistor may become conducting and turn the other off, and on another application of power the other transistor may become conducting and turn the first transistor off.

Assuming that transistor 1 is rendered conducting, as by application of a negative pulse to its "Set" terminal and through resistance 14 to the base electrode, current flows from ground through its emitter, collector and resistance 3 to the negative terminal D of the source of operating potential. The collector electrode C of transistor 1 is then at substantially ground potential. This, by reason of resistor 6, renders the base electrode B of transistor 2 sufficiently positive so that no current can flow from emitter to base and that transistor is non-conducting.

Should transistor 2 be rendered conducting, as by applying a negative pulse to its reset terminal, and through resistance 15 to its base electrode, then current flows through its emitter and collector and resistor 4 to the negative terminal of the source. Its collector is then substantially at ground potential and through resistance 7 renders the base of emitter 1 sufficiently positive to render transistor 1 nonconducting.

In accord with my invention means are provided such that when power is removed from conductors A and D and then reapplied the transistor, which was conducting when power was removed, again becomes conducting and renders the other transistor nonconducting. In this way the flip flop remembers what its condition was when power was removed and returns to that condition when power is reapplied.

This means comprises the inductor L having a winding 16 on a closed iron core connected between the positive terminals of the two resistors 3 and 4 through resistance 5, and which is included in the feed back path of transistor 2, which includes resistance 6. In addition, the capacitor 12 is connected between the base electrode of transistor 2 and the negative conductor D through resistance 13. This capacitor 12 tends to make transistor 2 first to become conductive, but its remaining conductive being dependent on the impedance of winding 16 of reactor L.

The inductance L has a hysteresis loop similar to that indicated in FIG. 2 in which the horizontal axis may correspond to the ampere turns of the coil 1, and the vertical axis may correspond to the density of flux in the core.

Let us assume that transistor 1 is conducting and transistor 2 is nonconducting. Current then flows in resistor 3 making its upper terminal more positive than the upper terminal of resistor 4. Current then flows in winding 16 in the direction of the arrow 14 sufficient to produce flux in the core corresponding to point *f* on the hysteresis loop of FIG. 2. When that current is removed or interrupted the remanence flux remaining in the core will have a value corresponding to the point *c* on the hysteresis loop. This condition remains until current is produced in the core flowing in the opposite direction.

With transistor 2 conducting and transistor 1 nonconducting current flows in winding 16 in the opposite direction sufficient to establish flux in the core corresponding to point *e* on the hysteresis loop of FIG. 2. When that current is interrupted the remanence flux in the core will have the value indicated at point *d*. Thus during steady state conditions there is always flux in the core, in one direction or the other, having a value saturating the core. If current is produced in the winding 16 having flux aiding the remanence flux the winding has little impedance because the value of the flux in the core changes only slightly. If a current in the opposite direction is produced, however, then the flux can change to a large extent, reversing in direction, and thus the winding has large impedance.

Let us assume now that transistor 1 is conducting and transistor 2 is nonconducting. Current flows through the winding of inductance L and resistance 5 in the direction indicated by the arrow 14 to produce flux in the core corresponding to the point *f* in FIG. 2.

Then, if power be removed this flux in the core returns to the value *c* still retaining a large remanence flux density in the positive direction. Condenser 12 discharges during the interruption of power.

Now suppose that power be restored on conductors A and D. Because of the discharged condition of condenser 12, transistor 2 immediately tends to turn on since the resistances 11, 6, 5 and 4 are initially proportioned to make the base slightly negative relative to ground while the capacitor 12 is charging. This is only for a transient instant, however, sufficient to turn transistor 2 on.

To maintain this transistor 2 on, current must flow from ground through the emitter E and base B of transistor 2, resistance 6 and inductance 16 in the negative direction, i.e., in the direction to produce large change in flux, and hence in the direction in which winding 16 has large impedance. Before such current can develop condenser 12 charges to such a value that the potential of the base electrode varies in the positive direction and consequently transistor 2 is turned off. Condenser 12 charges in less time than is required to reverse the flux in the core of reactor L. Thus transistor 1 is turned on and the condition prior to interruption of power is restored.

Now assume that transistor 2 is on when power is interrupted. Current then flows in the negative direction indicated by arrow 17 and the flux condition is as indicated at *e* in FIG. 2. On interruption of power the flux assumes the value indicated at *d* in FIG. 2 and the winding has large impedance to positive current and low impedance to negative current.

During the interruption in power condenser 12 again discharges thereby conditioning transistor 2 to become conductive immediately upon restoring of power on conductors A and D. Now, however, the current in the circuit from ground through the emitter and base of transistor, resistance 6 and inductance L flows in the direction to aid the already existing flux in the core and in which winding 16 has low impedance. Thus transistor 2 remains conductive and through resistance 7 renders transistor 1 nonconductive.

Of course if the voltage on conductors A and D were increased gradually, or at a rate slower than that required for flux in the core of inductance L to reverse and build up in the opposite direction, the action may become unreliable in assuring that flip flop assumes the condition it was in prior to interruption. However, voltage to these conductors is ordinarily applied abruptly as by closing a switch, or operating a relay, and this possible unreliability is not commonly encountered, or if encountered can readily be avoided.

Of course, the values of the circuit constants may be varied widely and I do not wish to be limited with respect thereto and, by way of example only, I set forth here one set of such values that have been used in a circuit using 2N526 transistors which operated satisfactorily:

| | | |
|---|---|---|
| Resistance: | | |
| 10 | ohms | 12,000 |
| 11 | do | 3,900 |
| 14 | do | 4,300 |
| 15 | do | 1,800 |
| 7 | do | 4,300 |
| 6 | do | 2,200 |
| 3 | do | 910 |
| 4 | do | 910 |
| 13 | do | 1,200 |
| Capacitor: | | |
| 12 | microfarad | .01 |

In the circuit illustrated a diode 18, which may not ordinarily be necessary, and which may be omitted, is shown. This diode has its anode connected to the right-hand terminal of winding 16, as illustrated, its cathode being connected to ground. Thus this diode becomes conductive when the right-hand terminal of winding 16 becomes positive with respect to ground and it therefore limits the positive swing of the voltage at that terminal to ground. This may be desirable in situations where it is desired to interrupt the negative voltage on conductor D when the positive voltage on conductor A is not interrupted and without loss of the reliable memory action described.

While I have shown a patricular embodiment of my invention I do not wish to be limited thereto since modifications may be made both in the circuit arrangement and the instrumentalities employed and I contemplate by the appended claims to cover any such modifications as fall within the true spirit and scope of my invention.

What I claim as new and desire to secure by Letters Patent of the United States is:

1. In combination a pair of transistors, each having a base, an emitter and a collector, said collector being connected through respective load resistors to a source of negative potential, said bases being connected through respective resistors to a source of positive potential, said emitters being connected to a point of reference potential intermediate said positive and negative potentials, and the collector of each transistor being connected through a corresponding resistance to the base of the other transistor whereby when either transistor is conducting the other is rendered nonconductive, a saturable reactor connected between the positive terminals of said load resistors adapted to be saturated in either direction dependent on the direction of current flowing therein and having remanence flux in the corresponding direction when power is removed, whereby said reactor has larger impedance to current opposing said remanence flux than to current aiding said remanence flux, said reactor being connected in circuit with one of said resistances between a collector of one transistor and the base of the other, and a condenser connected between the base of said other transistor and said source of negative potential whereby during interruption of said negative potential said condenser discharges causing said other transistor, upon reapplication of said potential to tend to become conductive but to remain conductive only if said reactor has low impedance to current in said circuit.

2. In combination a pair of transistors connected in flip flop relationship, a source of operating potential, the connection of said transistors including a connection from the collector of each transistor to the base of the other to carry current passed from the emitter to base of said other transistor when said other transistor is conducting and to supply potential from the collector of the supplying transistor to said base of the other transistor to interrupt said current when the supplying transistor is conducting, an iron core saturable reactor winding in one of said connections, means connecting said reactor winding to said source to pass current through said winding in one direction when one of said transistors is conducting and in the other direction when the other is conducting, said currents being sufficient to establish large remanence flux in said core when said currents are interrupted whereby said winding has large impedance to current in one direction and low impedance to current in the other direction.

3. The combination of claim 2 with means tending to cause one of said transistors first to become conductive when operating potential is restored after an interruption.

4. In combination, a pair of transistors connected in flip flop relationship for bistable operation, each having a resistance in series therewith which alternately carry current as said transistors alternately become conductive, a saturable reactor connected between the terminals of one of said resistances nearest its respective transistors and the base electrode of the other of said transistors to carry current in alternate directions as said transistors become alternately conductive, said saturable reactor having large remanence flux produced by said current causing the reactance of the reactor to be small for currents flowing in the same direction as that which produced the remanence flux and large for currents in the reverse direction, which remanence flux remains when power to said transistors is interrupted, and means utilizing said high impedance to prevent the transistor that was nonconductive when said power was interrupted from becoming conducting when power is restored.

5. The combination, in a flip flop circuit, of a pair of transistors, connected in flip flop relationship to a source of operating potential having a terminal of one polarity connected through respective resistors to the collector electrode of each transistor and a terminal of opposite polarity connected to the emitter electrode of each transistor, a saturable reactor connected between the collector electrode of one of said transistors and the base electrode of the other of said transistors whereby current flows therein to produce flux in one direction when one transistor is conducting and in the other direction when the other transistor is conducting, said reactor having a remanence flux when said potential is interrupted, said remanence flux having the direction that it last had before said potential was interrupted, and means effective if said remanence flux is in one direction to disable one of said transistors from first becoming conductive sufficiently to reverse the direction of said flux whereby the transistor that was last conductive before operating potential was interrupted again becomes conductive when operating potential is restored.

References Cited in the file of this patent

UNITED STATES PATENTS

| | | |
|---|---|---|
| 2,913,708 | Paull | Nov. 17, 1959 |
| 2,954,532 | Pentecost et al. | Sept. 27, 1960 |
| 2,995,735 | Frank | Aug. 8, 1961 |
| 3,036,221 | Kleinschmidt | May 22, 1962 |